(12) United States Patent
Sentinelli et al.

(10) Patent No.: US 10,075,680 B2
(45) Date of Patent: Sep. 11, 2018

(54) VIDEO-SURVEILLANCE METHOD, CORRESPONDING SYSTEM, AND COMPUTER PROGRAM PRODUCT

(71) Applicant: STMicroelectronics S.r.l., Agrate Brianza (IT)

(72) Inventors: Alexandro Sentinelli, Milan (IT); Francesco Papariello, San Fermo della Battaglia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 134 days.

(21) Appl. No.: 14/306,276

(22) Filed: Jun. 17, 2014

(65) Prior Publication Data

US 2015/0002665 A1 Jan. 1, 2015

(30) Foreign Application Priority Data

Jun. 27, 2013 (IT) .............................. TO2013A0529

(51) Int. Cl.
| | |
|---|---|
| *H04N 7/18* | (2006.01) |
| *G06K 9/00* | (2006.01) |
| *G08B 13/196* | (2006.01) |

(52) U.S. Cl.
CPC ......... *H04N 7/188* (2013.01); *G06K 9/00771* (2013.01); *G08B 13/19682* (2013.01); *G08B 13/19669* (2013.01); *G08B 13/19695* (2013.01)

(58) Field of Classification Search
CPC ............... H04N 7/188; G06K 9/00771; G08B 13/19682; G08B 13/19669; G08B 13/19695
See application file for complete search history.

(56) References Cited

U.S. PATENT DOCUMENTS 5,561,469 A * 10/1996 Schultz ................ H04N 7/0355
348/465
6,473,095 B1 10/2002 Martino et al.
(Continued)

FOREIGN PATENT DOCUMENTS

WO 2001027763 4/2001

OTHER PUBLICATIONS

Search Report for Italian patent application No. 1020130529; The Hague, Holland, Apr. 2, 2014; 2 pages.
(Continued)

*Primary Examiner* — Sath V Perungvoor
*Assistant Examiner* — Philip Dang
(74) *Attorney, Agent, or Firm* — Seed IP Law Group LLP

(57) ABSTRACT

An embodiment of a video-surveillance method comprising: activating a video camera for acquiring, for a surveillance system comprising the aforesaid video camera, a digital video sequence of images of a scene to be surveyed, detecting given events and transmitting to a remote center images of the aforesaid digital video sequence of images acquired according to the result of the aforesaid operation of event detection. An embodiment includes: executing an operation of extraction of key frames on the aforesaid digital video sequence of images for composing a visual storyboard, detecting given events on the basis of data supplied by one or more event sensors for generating an event signal, controlling operating states assumed by the aforesaid key-frame-extraction operation as a function of the values assumed by the aforesaid event signal, and transmitting the aforesaid visual storyboard to the aforesaid remote center.

17 Claims, 10 Drawing Sheets

(56) References Cited

U.S. PATENT DOCUMENTS

| | | | |
|---|---|---|---|
| 6,549,643 B1 | 4/2003 | Toklu et al. | |
| 6,690,725 B1 | 2/2004 | Abdeljaoud et al. | |
| 7,016,540 B1 | 3/2006 | Gong et al. | |
| 7,184,100 B1* | 2/2007 | Wilf | G11B 27/28 348/700 |
| 7,504,942 B2* | 3/2009 | Marman | G06K 9/00362 340/541 |
| 7,613,365 B2 | 11/2009 | Wang et al. | |
| 7,843,491 B2* | 11/2010 | Vallone | G08B 13/19693 348/143 |
| 7,847,820 B2* | 12/2010 | Vallone | G06K 9/00288 348/143 |
| 7,864,980 B2* | 1/2011 | Evans | G06K 9/00771 348/154 |
| 7,953,090 B2* | 5/2011 | Wei | H04L 12/2856 370/392 |
| 8,121,078 B2* | 2/2012 | Siann | H04N 7/185 370/328 |
| 8,218,011 B2* | 7/2012 | Cheng | G06K 9/00771 348/159 |
| 8,270,733 B2* | 9/2012 | Cobb | G06K 9/00771 340/853.2 |
| 8,358,342 B2* | 1/2013 | Park | G06K 9/00771 348/136 |
| 2004/0088723 A1 | 5/2004 | Ma et al. | |
| 2005/0228849 A1 | 10/2005 | Zhang | |
| 2006/0288288 A1 | 12/2006 | Girgensohn et al. | |
| 2007/0182861 A1 | 8/2007 | Luo et al. | |
| 2007/0226624 A1 | 9/2007 | Peker et al. | |
| 2007/0263128 A1 | 11/2007 | Zhang | |
| 2010/0174915 A1* | 7/2010 | Prokin | G06Q 40/02 713/189 |
| 2011/0032353 A1* | 2/2011 | Vallone | G08B 13/19693 348/143 |
| 2011/0050897 A1* | 3/2011 | Cobb | G06K 9/00771 348/143 |
| 2012/0081580 A1* | 4/2012 | Cote | H04N 5/335 348/231.99 |
| 2013/0022242 A1* | 1/2013 | Cobb | G06K 9/6251 382/103 |
| 2013/0336590 A1 | 12/2013 | Sentinelli et al. | |

OTHER PUBLICATIONS

Sentinelli et al.: "Metodo e Apparato per Generare in Tempo Reale Uno Storyboard Visuale", Italian Patent Application No. VI2013A000104; Dec. 6, 2012; Roma, Italy, 75 pages.

Furini et al., "VISTO: VIsual STOryboard for Web Video Browsing," CIVR '07, Amsterdam, The Netherlands, Jul. 9-11, 2007, 8 pages.

Narasimha et al., "Key Frame Extraction Using MPEG-7 Motion Descriptors," Proceedings of the Asilomar Conference on Signals, Systems, and Computers, Pacific Grove, CA, Nov. 9-12, 2003, pp. 1575-1579.

Yeung et al., "Efficient Matching and Clustering of Video Shots," Proceedings of the International Conference on Image Processing, Washington, D.C., Oct. 23-26, 1995, pp. 338-341.

Zeng et al., "Instant Video Summarization during Shooting with Mobile Phone," ICMR '11, Trento, Italy, Apr. 17-20, 2011, 8 pages.

Zhuang et al., "Adaptive Key Frame Extraction Using Unsupervised Clustering," Proceedings of the International Conference on Image Processing, Chicago, IL, Oct. 4-7, 1998, 5 pages.

* cited by examiner

VIDEO-SURVEILLANCE METHOD, CORRESPONDING SYSTEM, AND COMPUTER PROGRAM PRODUCT

PRIORITY CLAIM

The instant application claims priority to Italian Patent Application No. TO2013A000529, filed 27 Jun. 2013, which application is incorporated herein by reference in its entirety.

TECHNICAL FIELD

An embodiment relates to techniques of surveillance using video cameras.

Various embodiments can be applied to video surveillance of scenes to be surveyed combined with the use of surveillance sensors.

SUMMARY

Surveillance systems are known that use video sequences of scenes to be surveyed acquired by one or more video cameras, which are then made available to remote centers, for example, control centers or else server computers that enable a plurality of users and systems to access, display, and analyze the aforesaid sequences. It is likewise known to activate acquisition of images by the video camera upon detection of an event in the scene to be surveyed or in any case in a given area or in a given condition for the aforesaid activation.

A conventional surveillance system using video cameras is described with reference to FIG. 1. This system 10 envisages a trigger sensor 11 for activating the video-surveillance system, which detects a situation that is liable to activate the video-surveillance system to film the scene to be surveyed, for example, movement of a subject 50 in a trigger space region that is in relation with the scene to be surveyed. The trigger sensor 11, which may, for example, be an infrared or microwave anti-intrusion sensor, or else also a movement sensor, perceives a movement or presence in a given trigger region. This trigger region in general coincides in part or altogether with the scene to be surveyed and filmed by the video camera 12. However, it is clear that the trigger region may also be separate from the scene, such as, for example, in the case of a movement sensor that detects a trigger region on the ground and a video camera that films a scene, the lower limit of which is set higher than ground level.

Detection of the above circumstance, via a trigger signal T, hence actuates a video camera 12 that films the scene and stores a stream 16 of acquired images AS locally in a memory available therein, for example, a memory of the video camera 12, as sequence 17 of stored images SS. Then the sequence 17 of stored images SS is sent to a remote center, for example, a remote gateway 19. The sequence stored 17 is then transmitted, as a transmitted stream of images 18, to a gateway 19, which renders the stream accessible to other devices or applications operating in server mode. The operations of storage and transmission of the stream of images are executed under the control of an event-detector module 13, which controls storage of video sequences on the basis, or as a function, of detection of given events, by one or more sensors, which indicate the need to store and then transmit video sequences regarding the scene to be surveyed. Sensors may coincide with the trigger sensor 11 or the video camera 12, or may even consist of, or include, other sensors.

The above approach is, however, particularly expensive in terms of power consumption in so far as it requires the video camera to store and then transmit streams that have a rather cumbersome size.

Therefore, embodiments described herein improve the potential of conventional devices as discussed previously.

Various embodiments may refer to corresponding surveillance systems, as well as to a computer program product that can be loaded into the memory of at least one computer (e.g., a terminal in a network) and includes portions of software code designed to execute the steps of the method when the program is run on at least one computer. As used herein, the aforesaid computer program product is understood as being equivalent to a computer-readable means, such as a non-transient computer-readable means, containing instructions for controlling the computer system so as to coordinate execution of a method according to an embodiment. Reference to "at least one computer" is intended to emphasize the possibility of an embodiment being implemented in a modular or distributed form.

Various embodiments may provide a reasonable synthesis between security of detection and rapidity of transmission. Various embodiments may hence provide the capacity of entering a wait or standby state to complete a summary of frames (storyboard) in the case of an event made up of subevents. Various embodiments may size the parameters for key-frame extraction so as to take into account the type of event that occurs, or the state parameters of the video-surveillance system, in particular state parameters of the video camera, so as to optimize, for example, consumption or use of the memory. Various embodiments may make the storyboard available remotely to other systems or devices for carrying out surveillance. Various embodiments may enable remote setting of parameters of the extraction operation for one or more video cameras of the surveillance system, thus enabling configuration of operation of the system, in particular according to the resources of each video camera and of the system as a whole.

BRIEF DESCRIPTION OF THE DRAWINGS

Various embodiments will now be described, purely by way of example, with reference to the annexed drawings, in which.

DETAILED DESCRIPTION

In the ensuing description, numerous specific details are provided in order to facilitate as much as possible understanding of the embodiments, which are provided by way of example. The embodiments may be implemented with or without certain specific details, or else using other methods, components, materials, etc. In other circumstances, structures, materials, or operations that are well known are not illustrated or described in detail so that certain aspects of the embodiments will not be obscured. In the course of the present description, reference to "an embodiment" or "one embodiment" is intended to indicate that a particular peculiarity, structure, or characteristic described in connection with the embodiment is included in at least one embodiment. Hence, the recurrence of the phrase "in an embodiment" or "in one embodiment" in various points of the present description does not necessarily refer to one and the same embodiment. Moreover, the particular peculiarities, structures, or characteristics described herein may be combined in any convenient way in one or more embodiments regardless of the embodiment or embodiments in conjunction with they are described.

The titles and references are provided herein merely for the convenience of the reader and do not define the scope or the meaning of the embodiments.

Figure 2:
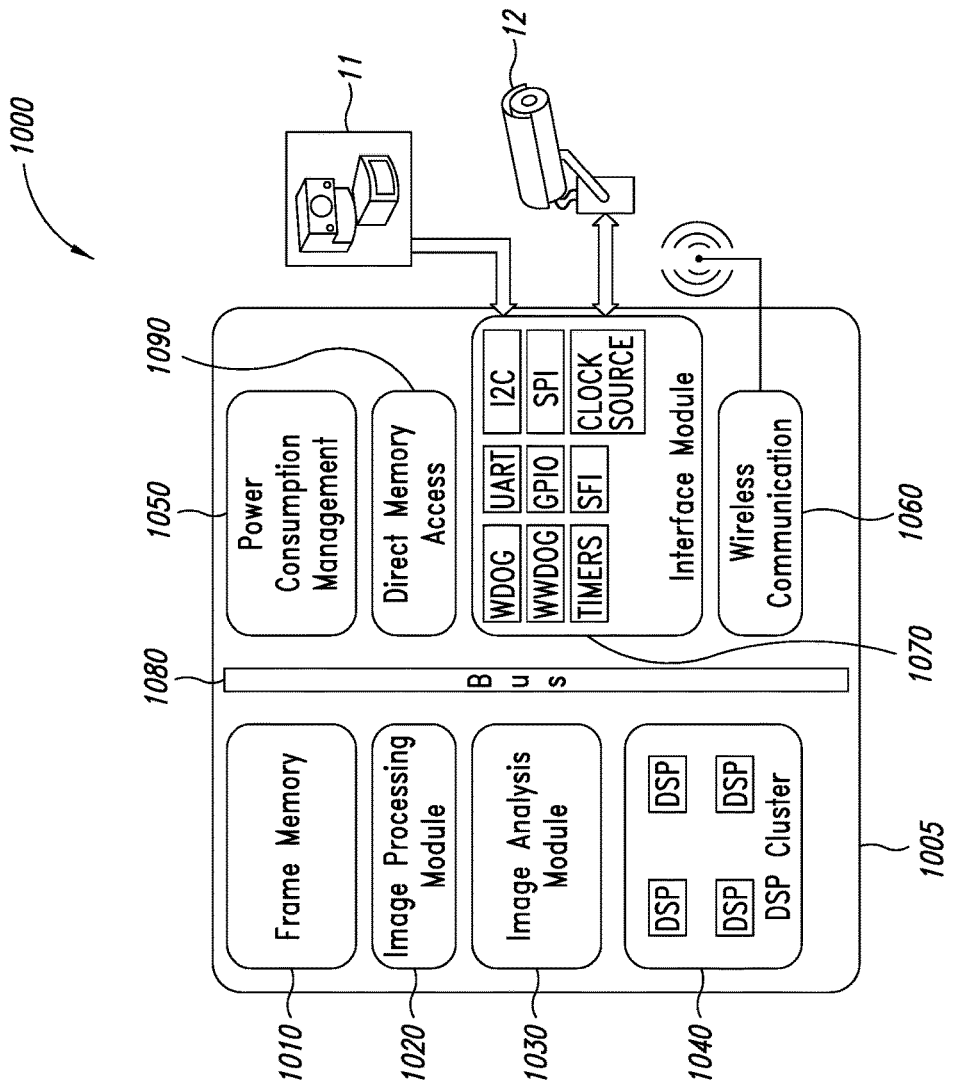
FIG. 2 is a principle diagram of a System-on-Chip designed to be used in the surveillance system according to an embodiment.

Described in what follows with reference to FIG. 2 is an architecture of a video-surveillance system 1000 that implements a method according to than embodiment. In particular, the aforesaid surveillance system 1000 is implemented through the platform represented by a System-on-Chip (SoC) 1005 that includes modules particularly dedicated to surveillance in conditions of low power consumption.

The surveillance systems according to an embodiment have capacities that call for the presence of sensors and nodes with video cameras having advanced data-processing capacities. The above computational capacities in the video cameras enable scalability of the system and enable the system to operate with a narrow data-transmission band. Centralized systems have in fact the inherent disadvantage of a limited scalability and of overloads of the central acquisition nodes. Systems that instead distribute the computational resources present, on the other hand, the problem of the costs per unit, due to the large number of nodes in a complex surveillance system, or restricted energy budgets that limit the computational complexity that can be managed by a single node.

The System-on-Chip 1005 illustrated in FIG. 2 is designed to operate with constraints of low power consumption and low cost per unit, envisaging high computational capacities with smart video cameras that operate in video-surveillance systems. The above System-on-Chip 1005 operates, in particular, in ultra-low power systems, including battery ones, and includes dedicated video-processing and image-processing circuits, a cluster of four ultra-low-power DSPs (Digital Signal Processors), on-chip memory, a wireless communication channel, and various interfaces for making the connection with the CMOS sensors of a video camera, microphones, movement sensors, and presence sensors.

The aforesaid System-on-Chip 1005 hence specifically includes a frame memory 1010, a module configured for image processing 1020, and a module for image analysis 1030. The image-processing module 1020 performs all the operations that enable the output of the sensor to become a 'clean' output that can be used by the end user; for example, they perform color conversions, corrections of defects of the sensor or of aberrations of the lens, etc. The image-analysis module 1030 enables more advanced operations to be carried out, such as: segmentation between background image and current image, to identify changes in the scene; updating of the background image to include in the background all the details that do not form part of the objects that are to be detected but that also constitute modifications with respect to the background (for example, noise, change of luminosity, minor movements of objects that do not form part of what is to be detected, for example, movement of trees, etc.); a DSP cluster module 1040 including four ultra-low-power DSP cluster modules; a consumption-management module 1050; a direct-access memory 1090; a wireless-communication module 1060 for receiving and transmitting data; as well as an interface module 1070, designed to interface with sensors of different types, amongst which trigger sensors, anti-intrusion sensors, movement sensors, or presence sensors, 11, as well as with a video camera 12.

The signals exchanged between the modules described above of the System-on-Chip 1005 are carried by a bus 1080.

Figure 1:
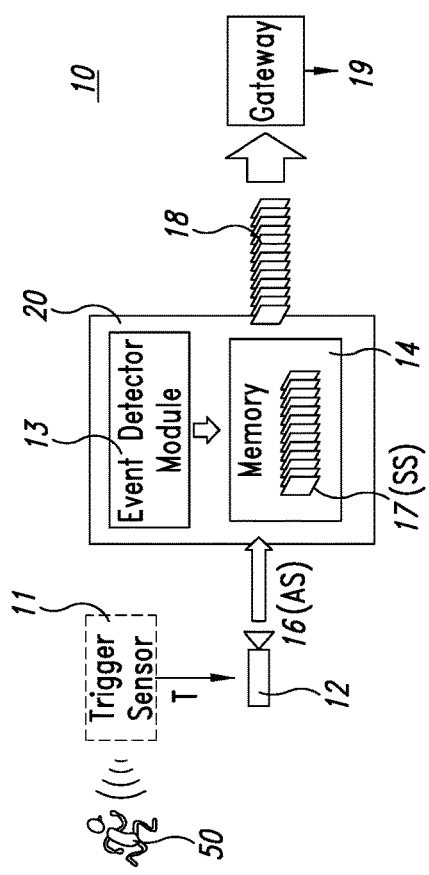
FIG. 1 is a block diagram of a surveillance system operating in a conventional manner.
Figure 3:
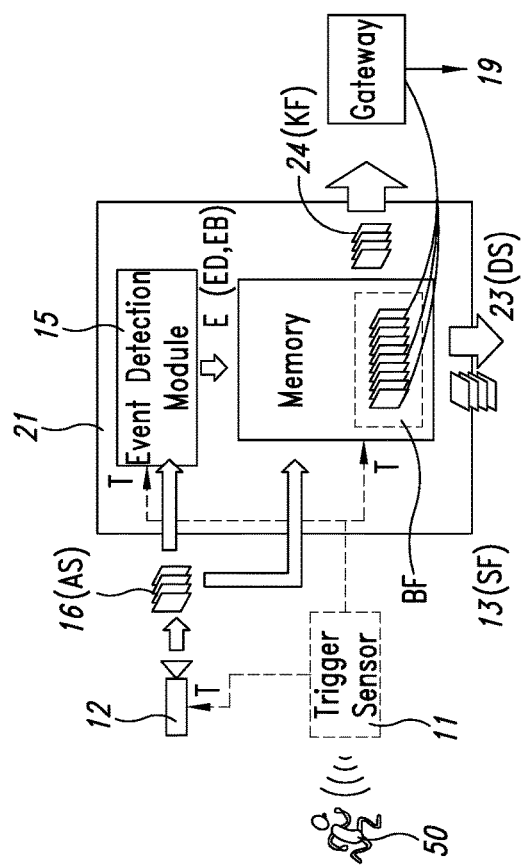
FIG. 3 shows by way of example a block diagram of a surveillance system operating according to an embodiment.

With reference to FIG. 3 there now follows a description of a method according to an embodiment.

The method envisages employing a combination of procedures of event detection and key-frame extraction for introducing a different form of representation of the information through key frames rather than complete video streams.

In what follows, reference will hence be made to a generation of a visual storyboard on the basis of the contents of a digital video sequence, which is known in the literature as "key-frame extraction" (KFE) and envisages that a list of the most representative frames, i.e., key frames, is extracted automatically via post-processing and stored in association with the video sequence. By displaying the storyboard, formed, for example, by thumbnail-format images, it is possible to decide whether or not to display the completed video sequence associated therewith.

Key-frame-extraction techniques are in themselves known, for example, from the U.S. Pat. No. 7,184,100, which is incorporated by reference. In the present description, reference will be made to key-frame-extraction techniques and "live" storyboard-generation techniques described in detail in the Italian patent application No. VI2012A000104, which is incorporated by reference.

Consequently, illustrated in FIG. 3 is a video camera 12 that acquires, under the control of the trigger signal T issued by a trigger sensor 11, a stream 16 of acquired images AS. This stream 16 of acquired images AS is sent, in a processing module 21, both to an event-detection module 15 and to a frame-extraction module 22, the operation of both of the aforesaid modules being set under way by the trigger sensor 11 by issuing the trigger signal T. The frame-extraction module 22, under the control of an event signal E emitted by the event-detection module 15, produces, on the basis of the acquired images AS, a flow 23 of images to be discarded DS and a flow 24 of key frames KF to be transmitted to the gateway 19.

Figure 4:
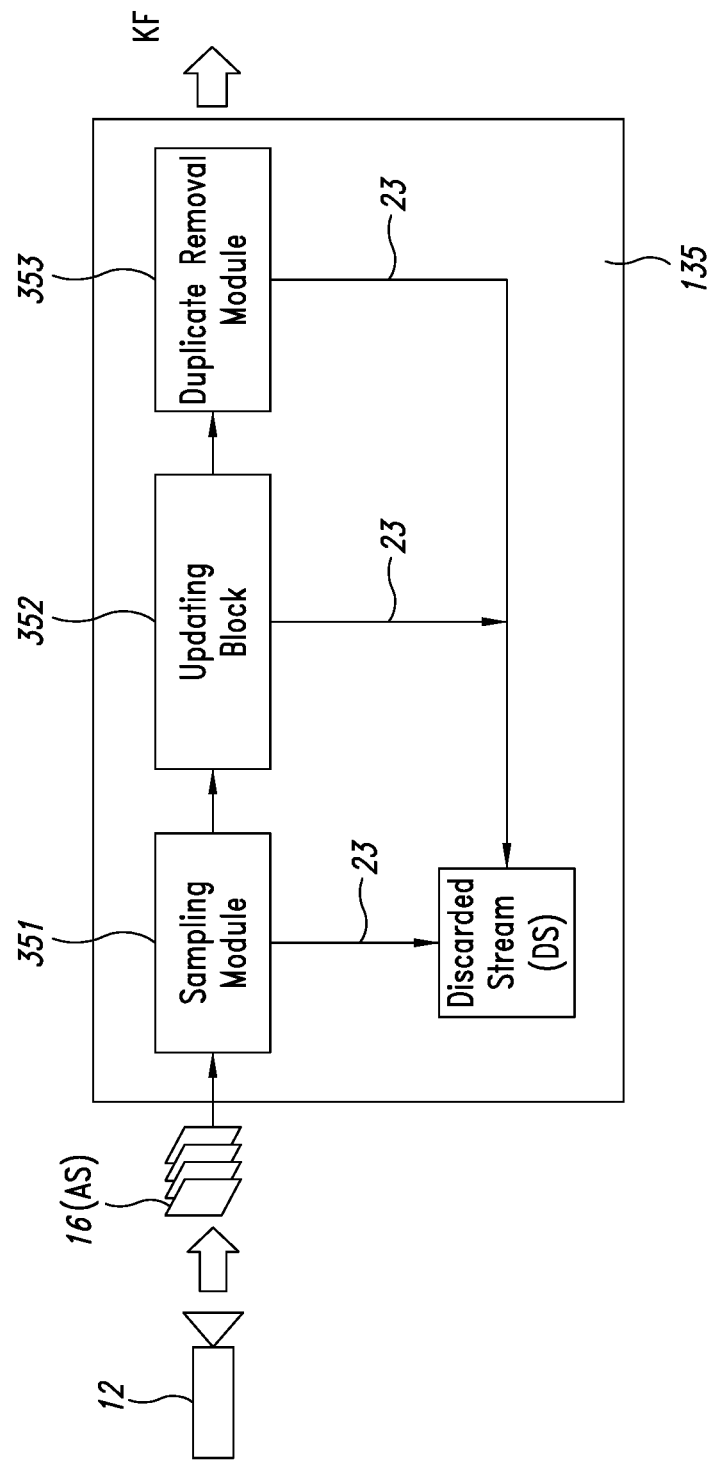
FIG. 4 shows by way of example a block diagram of a key-frame-extraction operation according to an embodiment.

Hence, according to an embodiment, there is envisaged acquisition via the video camera 12 of a stream 16 of acquired images AS of a scene filmed by the video camera 12 itself and execution of key-frame extraction KF from the aforesaid stream 16 via the steps of:

collecting candidate key frames SF selecting them from among the acquired frames AS in the stream 16, in particular, for example, via operations of sampling and filtering as described with reference to FIG. 4;

storing the aforesaid candidate key frames SF in the frame-extraction module 22, which is, in particular, associated with the system 1000 including the video camera 12, as candidate key frames KF; and transmitting the key frames KF making up the storyboard SB, in particular after further operations of sifting, such as operations of removal of duplicates like the one described in FIG. 4, from the video camera 12 to a remote system, which is, in the example, represented by the gateway 19.

The key-frame-extraction operation in the key-frame extraction module 22 is executed as a result of detection of events by the event-detection module 15, which receives and analyzes data $d_0, d_1, \ldots, d_n$ supplied by event sensors $S_0, S_1, \ldots, S_n$, which, as will be illustrated in greater detail hereinafter, may include the trigger sensor 11 and the video camera 12.

Figure 14:
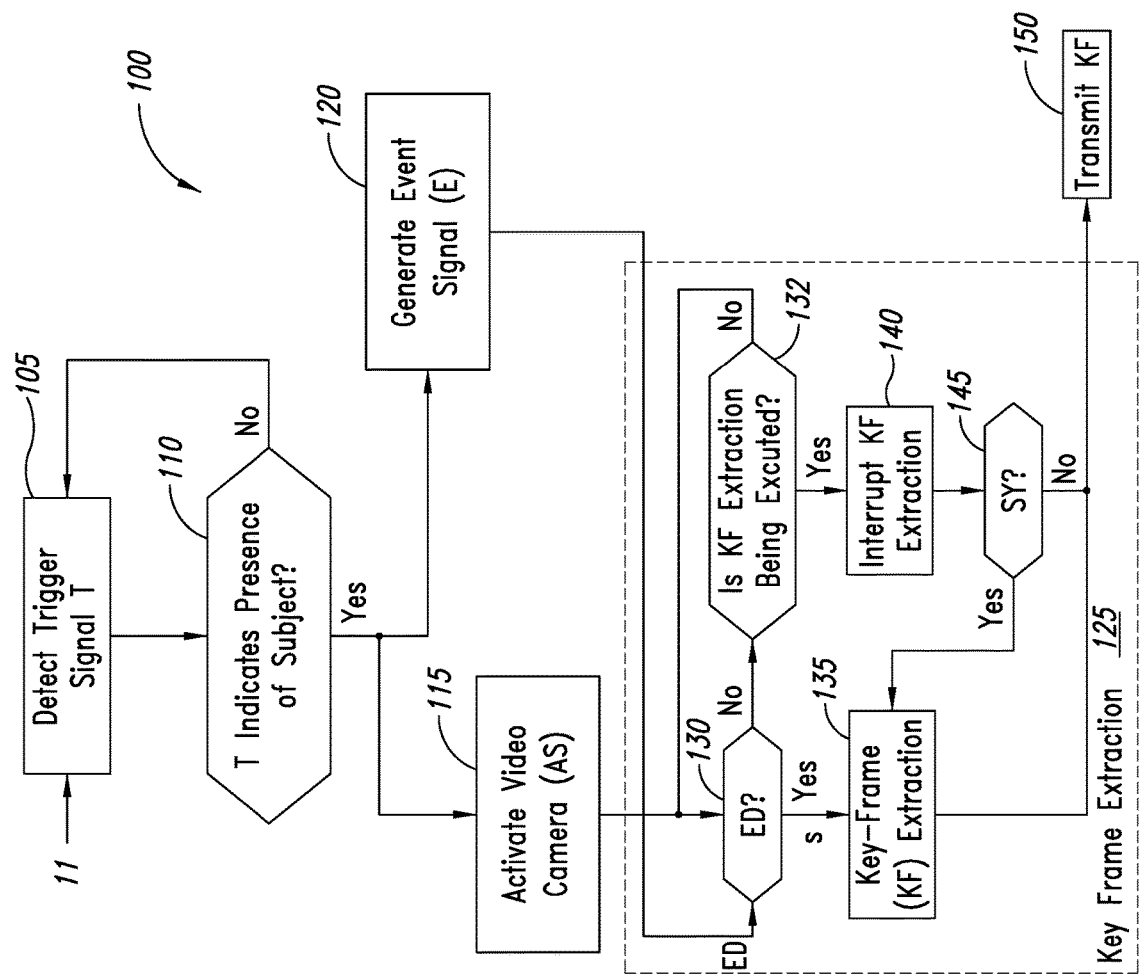
FIG. 14 is a flowchart illustrating operations of a method according to an embodiment.

Illustrated in FIG. 14 is a flowchart 100 of an embodiment exemplifying the above-described method in which, in a detection step 105, the trigger signal T is detected by the trigger sensor 11, and, in a step 110, it is verified whether the trigger signal T indicates detection of the presence of a subject 50 in a trigger area. If it does not, control returns in a loop to the detection step 105; if it does, there is activation, in a step 115, of the video camera 12, which films the scene surveyed, generating a stream of acquired frames AS, and, in a step 120, of the event-detection module 15, which generates an event signal E, in particular, as illustrated more fully in what follows, with reference, for example, to FIG. 5 or FIG. 6, an event logic signal E, which may also be regarded as a binary signal EB. The frames AS acquired by the video camera 12 following upon the start determined by the trigger signal T are supplied to a procedure 125 of key-frame extraction executed in the frame-extraction module 22 under the control of the event logic signal E. In a step 130, there is hence evaluated the value assumed by the event logic signal E: in the presence of a positive event logic signal E, i.e., EDtrue, the extraction module 22 is activated and the operation of key-frame extraction 135 from the acquired frames AS is carried out. Instead, in the presence of a negative event logic signal E, i.e., EDfalse, in a verification step 132, it is evaluated whether the operation of key-frame extraction 135 is being executed. If it is not, control returns to checking the state of the event logic signal E in step 130. If it is, an operation 140 of interruption of key-frame extraction is carried out, and control passes to a step 145, where it is evaluated whether the system 1000 is in a standby state SY, the meaning of which will be exemplified more clearly in what follows with reference to FIGS. 8, 9, 10 and 11. If the system 1000 is in a standby state SY, execution of the operation 135 of extraction of key frames KF is resumed. If it is not, a step of transmission 150 of the key frames KF is executed, which includes closing the key-frame-extraction procedure 125, in particular by deactivating or turning off the extraction module 22, and sending to a remote system, in particular, for example, a gateway 19, the key frames KF that are stored, in particular in a key-frame-extraction buffer BF, for composing the storyboard SB, which sums up the stream 16 of images acquired pending a given event E.

The standby state, as described more fully in what follows, enables more efficient management of the procedure of key-frame extraction, in particular in the case of close multiple events generated by one and the same subject or cause.

Figure 10:
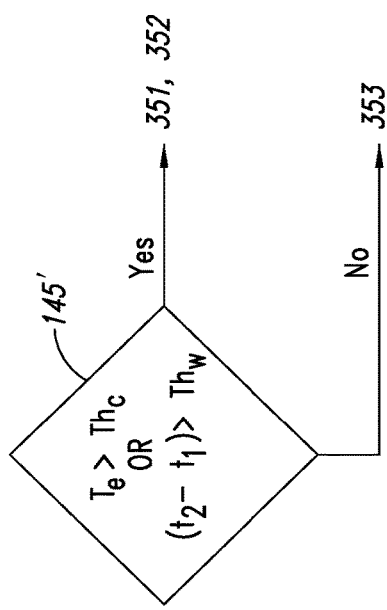
FIG. 10 is a flowchart representing an operation of evaluation of a standby condition executed in an embodiment described in conjunction with FIGS. 8, 9, and 11.

In what follows, with reference to FIG. 10, illustrated in detail is a verification block 145', which represents an embodiment of the evaluation of the standby state SY.

Figure 6:
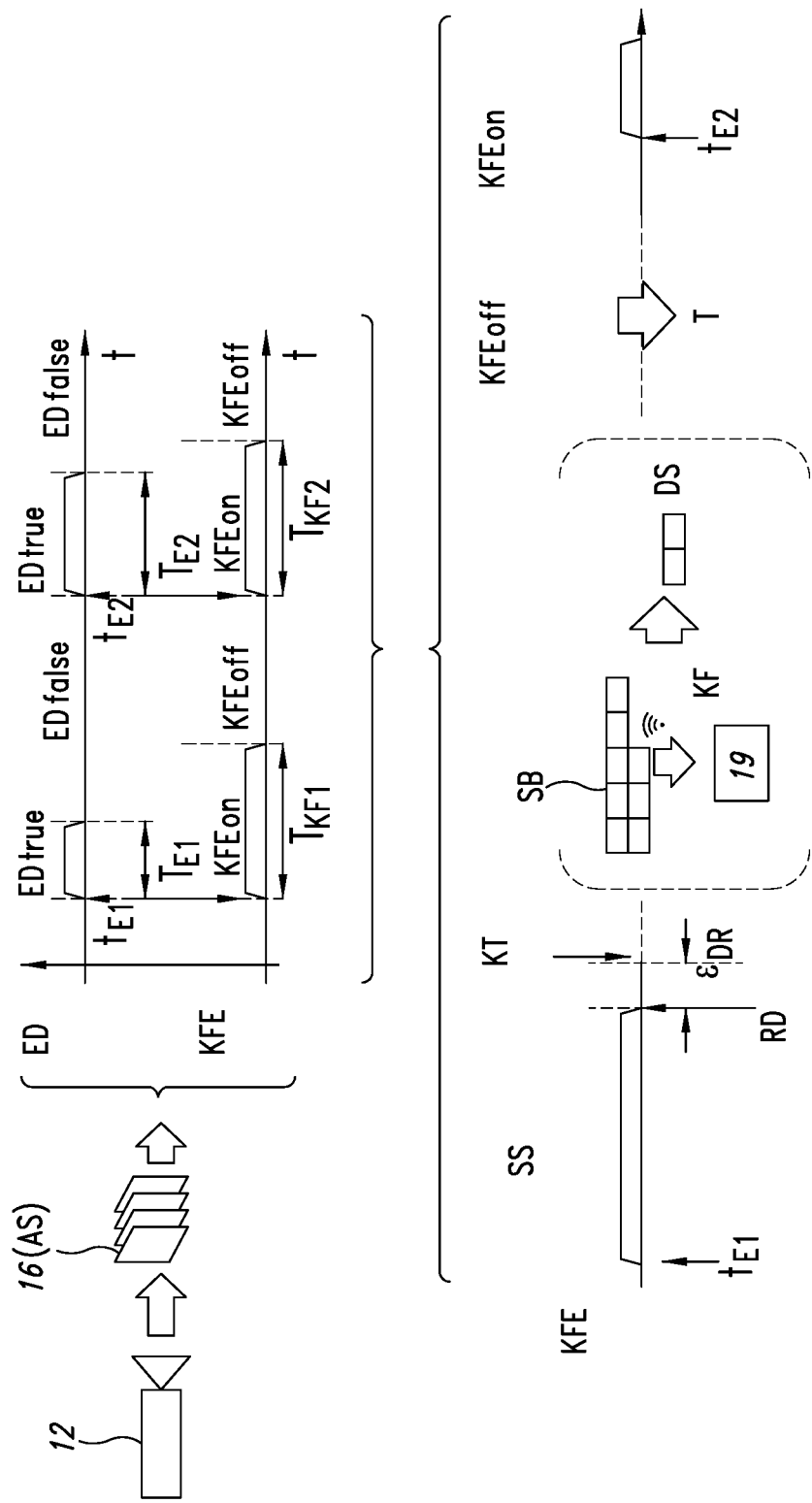

However, an embodiment simpler than the one illustrated in FIG. 14, where the block 145 for evaluation of the standby state may not be present, and consequently the key-frame-extraction operation is executed (step 135) and closed (from step 140 control passes directly to step 150, with deactivation of the module 22) according to the logic state of the logic signal E, is illustrated, for example, in FIG. 6.

Illustrated in detail in FIG. 4 is a scheme of the operations executed when activation 135 of the key-frame-extraction operation is carried out in the key-frame-extraction module 22, which receives from the video camera 12 the acquired frames AS. These acquired frames AS are first sent to a smart sampling module 351, which carries out sampling at a sampling rate that may be constant or else a function of parameters such as the index of the candidate frame, the number of images recorded, or the time that has elapsed since start of the film, or some other function. Consequently, the aforesaid smart sampling module may possibly generate a respective flow 23 of images to be discarded DS, which will never be selected as key frames. The aforesaid frames DS are frames AS normally acquired by the camera but not sampled; i.e., they are immediately eliminated.

Usually associated with the smart sampling module 351, for example, with a sampling period that varies according to the length of the video, is a filtering of the frame, where the filter discards the information of the image frame received according to a pre-determined criterion, such as the monotony of the frame, the poor quality of the frame, or similar criteria. In a further possible variant, the filter may be of a semantic type and determines the quality of a frame on the basis of a low-level analysis of the image data or of high-level metadata produced, for example, by a face-detection algorithm (number of faces, height/width/position of each face in the frame).

The frames sampled by the smart sampling module 351 are subjected to an updating block 352, which corresponds to sending thereof to the key-frame-extraction buffer BF for being stored therein and for updating the contents of the aforesaid buffer BF. Also during the aforesaid updating 352, there may be generated a flow 23 of frames to be discarded DS, which are immediately eliminated from the memory. The frames stored in the buffer BF are then sent to a duplicate-removal module 353, where the duplication of information between two image frames is determined on the basis of at least one predetermined criterion. This criterion may be a similarity-matching criterion or a similarity matrix or a measurement and comparison of quality. It may also include the use of K-means algorithms, which are in themselves known.

Consequently, in turn, also the duplicate-removal module 353, which carries out elimination of duplicate frames on the basis of the aforesaid predetermined criteria, generates a flow 23 of images to be discarded DS and of the key frames KF selected at output from the buffer BF and from the extraction module 22. Operation of the frame-extraction module 22, which is designed to generate a storyboard SB of key frames KF basically in a 'live' way during acquisition of the images by the video camera 12, is described in detail in Italian patent application No. VI2012A000104, which is incorporated by reference.

The key-frame-extraction buffer BF is, for example, formed in the memory of the System-on-Chip 1005, specifically, in the frame memory 1010. However, it may also be obtained in the memory of the video camera 12, which can be the RAM of the chip of the video camera 12. The buffer BF may also be obtained by storing the frames in a temporary way in memory cards, such as SD cards or flash memories.

Likewise, the processing module 21 may be obtained through the DSP cluster 1040, but also via another processor available in the system. In particular, operations, such as frame duplication, may be implemented via the image-analysis module 1030.

With reference to the process of key-frame extraction 125 described in FIG. 14, it is emphasized that, even though in general, as described with reference to FIG. 4, the duplicate-removal step 353 may be considered to be included in the key-frame-extraction procedure 125, step 150 of FIG. 14 may also include the operations of emptying the buffer BF of the candidate key frames SF and carrying out removal of duplicates 354, in addition to subsequent deactivation of the key-frame-extraction procedure 125 and sending of the key frames KF.

Consequently, with reference to what has just been described, a more simplified embodiment is possible, in which the frame-extraction module 22 can assume two states:

ON or activated, in which the operations of frame extraction 135 and buffer updating BF are executed; and OFF, corresponding to the operation 150 in which the buffer BF is emptied, the duplicate-removal operation 353 is executed, and the key frames KF thus obtained are transmitted.

In an embodiment, instead, the frame-extraction module 22 can assume three states:

ON or activated, in which it executes the operation 135 and updates the buffer BF;

standby SY, where there is carried out the interruption 140 and checking of the existence of the standby state 145; from the standby state SY it is possible to resume the operation 135, starting again filling of the buffer BF from the point of filling at which the operations 135 had been interrupted; and OFF, corresponding to the operation 150 in which the buffer BF is emptied, the duplicate-removal operation 353 is executed, and the key frames KF thus obtained are transmitted.

There now follows a more detailed description of some aspects of the steps implemented by a surveillance method according to an embodiment.

As has been said, it is possible to use the information, i.e., the metadata, coming from one or more event sensors present in the system 1000, designated as a whole by $S_0, S_1, \ldots, S_n$ and discriminate, discern, and define an event through a function of the data $d_0, d_1, \ldots, d_n$ respectively supplied by the aforesaid event sensors $S_0, S_1, \ldots, S_n$. This set of event sensors $S_0, S_1, \ldots, S_n$ may include the trigger sensor 11, as well as the video camera 12 itself. In particular, the video camera 12, via different types of processing of the images filmed or in combination with the information coming from other types of sensors, enables implementation of detection of different and more specific types of events, as discussed in what follows. The output of the event-definition function produces information associated to the specific frame and constitutes an aid to deciding whether the frame in question may be considered a key frame or not.

The combination of the above sensor data $d_0, d_1, \ldots, d_n$, or 'sensor fusion', by different modules enables implementation of different variants of the function that defines the event. The event can be expressed as a vector $\vec{E}$ with a plurality of components, each linked to a sensor $S_0, S_1, \ldots, S_n$, $$\vec{E} = f(\vec{FD}, \vec{PD}, \ldots) \quad (1)$$

or as a single scalar E that combines all the values of the sensors $S_0, S_1, \ldots, S_n$.

$$E = f(\vec{FD}, \vec{PD}, \ldots) \quad (2)$$

In Eqs. (1) and (2), FD and PD indicate data $d_0, d_1, \ldots d_n$, where specifically designated by FD, for example, is the information or component regarding a detection of the face and designated by PD (which can be obtained for example via analysis of the images of the video camera 12) is the information regarding a detection of presence of persons, which may be obtained by the video camera 12 or by other presence sensors. Other information may regard smoke detection SD, by fire-detection sensors, or else also car detection CD, or else information that is derived, for example, from operations of analysis performed by the module 1030 of images acquired by the video camera 12.

Apart from detection of an event via the analysis of a single sensor, or sensor fusion, the event-detection module 15, even in its simplest form, for example, associated just with the information coming from the trigger sensor 11, is a module that provides further information regarding the scene surveyed that may be of aid in the key-frame extraction procedure 125.

Figure 5:
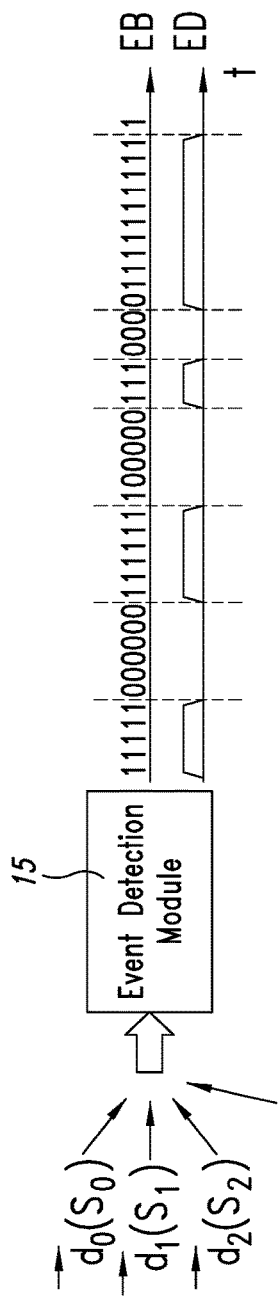
FIGS. 5, 6, and 7 are timing diagrams representing signals used by a surveillance method according to an embodiment.

The event-detection module 15 is basically a module that receives as inputs the data $d_0, d_1, \ldots, d_n$ of the various sensors $S_0, S_1, \ldots, S_n$, whilst the output, in an example the scalar event E, is a data stream of Boolean values (TRUE/FALSE, or logic '0' and logic '1'), which indicate when an event occurs or does not occur, as illustrated in FIG. 5. Illustrated in FIG. 5 is the logic state of a logic event-detection signal E as a function of time t, and the corresponding binary signal EB.

Activation of the key-frame-extraction procedure 125, as described, is made to depend upon the occurrence of the event E, i.e., on the basis of the states assumed in time by the corresponding event signals.

The surveillance system assumes in one embodiment two states: a first one, in which the video camera 12 carries out streaming, and the key-frame-extraction module 22 may be activated (ON); and a second one, in which the video camera 12 is off or in sleep mode (or else the system is carrying out transmission) and the key-frame-extraction module 22 is deactivated (OFF). However, according to an embodiment, there is envisaged a surveillance system that assumes three states:

an activated state, in which the video camera 12 carries out streaming and the key-frame-extraction module 22 can be activated (ON);

a deactivated state, in which the video camera 12 is off or in sleep mode (or else the system is carrying out transmission) and the key-frame-extraction module 22 is deactivated (OFF);

a wait state SY (STANDBY), in which the extraction buffer BF is basically frozen until an event starts or an event has resumed.

The above wait state may be advantageous for surveillance in the case where an object, animal, or person (for example, a burglar) appears on and disappears from the scene filmed by the video camera 12.

In other words, the key-frame-extraction module 22, as illustrated in FIG. 4, includes a buffer BF for storing the candidate key frames SF that are selected, which are transmitted when the buffer BF is full or in conditions described in what follows. At the moment of disappearance of the subject from the scene filmed by the video camera 12, the buffer BF may be only in a state of partial filling so that the key frames KF have not yet been transmitted to the remote system, i.e., to the gateway 19, or in any case to the user. The state of the buffer BF is hence frozen until the event E starts or resumes. In the activated state (ON), the video camera 12 performs streaming of the images acquired to the module 22, whereas in the OFF state, the video camera 12 is off (where "off" may be understood to mean, in particular, that it is in sleep mode) or else transmission of the key frames KF to the gateway 19 is in progress.

Described in what follows are the relations between occurrence of an event E and extraction of the key frames KF.

For this purpose, some quantities useful for describing the aforesaid relations are here indicated.

FIG. 6 shows, as a function of time, the logic signal E generated by the event-detection module 15 and an extraction signal KFE representing the state of activation (step 135) and the state of deactivation (step 150) of the key-frame-extraction module 22, in the context of video-surveillance operations. In this context, if i-th event $E_i$, with the index i integer, is detected, i.e., the logic signal E assumes the value EDtrue at an event instant $t_{Ei}$, the event-detection module 15 activates the key-frame extraction module 22 to carry out extraction of the key frames KF (the extraction signal KFE assumes the value KFEon, whereas when the extraction module 22 is deactivated it assumes the value KFEoff). It is emphasized how the key-frame extraction module 22 is still active for a short period after occurrence of the i-th event $E_i$ is no longer signalled by the event-detection module 15 (the logic signal E assumes the value EDfalse), i.e., as illustrated in FIG. 6, transition from the high logic level to the low logic level of the logic detection signal E has occurred. Consequently, a duration $T_{KFi}$ of the key-frame extraction operation for the period in which the extraction signal KFE assumes the value KFEon respects the relation $$T_{KFi} \geq T_{Ei} \quad (3)$$

On the basis of detection of the i-th event $E_i$, it is then possible to map temporally the main steps of the key-frame-extraction procedure 125 before composition of the storyboard SB: collection of the key frames KF during video sampling 351, or smart sampling, removal of duplicates 353, transmission KT to the gateway 19, and possibly a sleep time, during which the key-frame-extraction module 22 is simply off and waits for the trigger signal T to switch it back on. These steps are illustrated in the timing diagram of the extraction signal KFE in FIG. 7.

As regards the duration of extraction of the key frames $T_{KFE}$, we have $$T_{KFE} = T_{KFC} + \varepsilon_{DR} + \varepsilon_r \quad (4)$$

where $T_{KFC}$ is the duration of the collection of key frames, i.e., the time necessary for collection of the frames, possibly key frames, in particular via the sampling step 351 and the updating step 352, $\varepsilon_{DR}$ is the time necessary for carrying out removal of duplicates 353 when these are present with any relation between adjacent/non-adjacent frames in temporal or descriptive terms, $\varepsilon_t$ is the time required for transmission KT of the key frames KF to the gateway 19 or to a remote user or to another remote device or monitoring center.

Given a time for the collection, it is possible also to define an event-duration threshold $Th_C$ that limits the duration $T_{Ei}$ of the event $E_i$. The time for collection of the key frames is finite on account of the size of the buffer BF; hence, we may impose that the process be closed, i.e., extraction of the key frames be deactivated and transmission KT is carried out, if $$T_E \geq Th_C \quad (5)$$

When the event lasts longer than the event-duration threshold $Th_C$ the session of key-frame extraction 125 is concluded.

This requires setting of the value of the event-duration threshold $Th_C$. The chain of operations of FIG. 6 illustrates a simple case of example of video surveillance: a given i-th event $E_i$ occurs, in particular the event $E_1$ at the event instant $t_{E1}$; extraction of the key frames starts; the event $E_1$ ceases to occur; and extraction of the key frames stops. When removal of the duplicates is carried during extraction of the key frames, this means that, during the operation of extraction of the key frames, a decision to close the operation has been taken.

Figure 7:
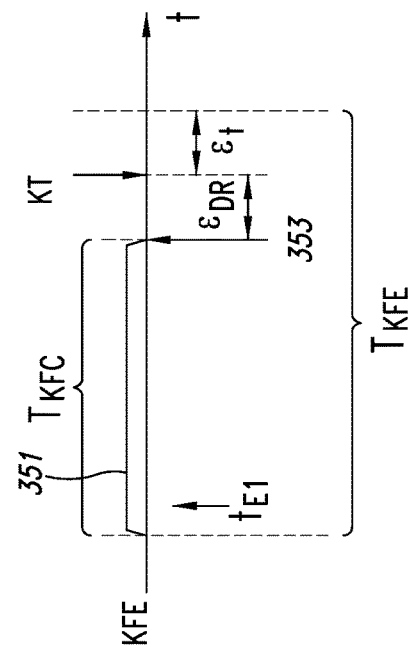

Illustrated in FIG. 7 is a timing diagram of the activation signal KFE that shows in detail the period in which collection of the key frames is performed.

Since the time $\varepsilon_{DR}$, which is the time necessary for removing the duplicates, and the time $\varepsilon_t$ required for transmission of the key frames KF are negligible as compared to the duration of the key-frame collection $T_{KFC}$ we may also say that $$\varepsilon_{DR}, \varepsilon_t << T_{KFC} \rightarrow T_{KFC} \cong T_{KFE} \quad (6)$$

Relation (6) enables the value of the duration of the collection of key frames $T_{KFC}$ to be linked to the event-duration threshold $Th_C$ according to relation (5). This implies another consequence as regards the duration of the event $T_E$, namely $$T_{KFE} \approx T_E \quad (7)$$

which will be more evident in the sequel of the present description.

Figure 8:
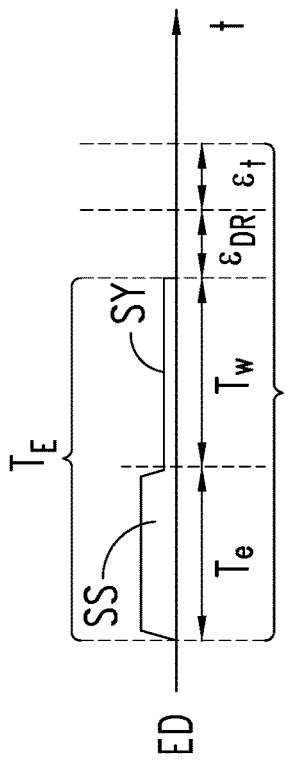
FIGS. 8, 9, and 11 are timing diagrams representing signals used by a surveillance method according to an embodiment.

Illustrated in FIG. 8 is a timing diagram of the logic event-detection signal E during the temporal duration of an event $T_E$.

By expanding the chain of FIG. 8, further steps and states that can be assumed by the key-frame-extraction operation are now illustrated, in particular in relation to a standby state SY.

In fact, as illustrated in FIG. 14, it is envisaged that, if an event $E_i$ is not occurring and the key-frame-extraction operation is interrupted, but not closed, i.e., deactivated with removal of the duplicates and transmission of the key frames, the aforesaid key-frame-extraction operation 135 can be resumed after a short period of time, referred to as "standby" or "wait interval", has elapsed since arrest. Hence the duplicate-removal step 353 is shifted forward in time to when the event $E_i$ will really have ceased to occur.

To implement a method with adoption of the standby state SY the event is associated with further specific parameters. In particular, the duration of the event $T_E$ is defined in relation to the duration of subevents and sub-intervals of time so as to be able to identify with these parameters the period in which the system 1000 is in the standby state SY.

To a first approximation, since the buffer BF in which the frames are stored has a finite size, if the event E is too long there is an instant when the surveillance system 1000 empties the buffer BF: before this instant, the operations of removal of the duplicates and transmission of the key frames stored in the buffer BF must take place. To handle the above steps and the states of the key-frame extraction properly the following parameters may be defined:

$T_{KFC}$, duration of the collection of key frames KF;
$T_E$, duration of the event;
$T_e$, net duration of the event;
$T_w$, wait time;
$Th_w$, wait-time threshold; and
$E_{SR}$, event-detection sampling rate.

Also in this case we have that, if $T_E \geq Th_C$, then the process is stopped and the operation 353 of removal of duplicates is performed, with emptying of the buffer BF and sending of the key frames.

The total duration of the event $T_E$ is given by the net duration of the event $T_e$, i.e., the time during which the output of the event-detection module 15 sent to the key-frame extraction module 22 is, in the example, at logic '1', i.e., EDtrue, added to the wait time $T_w$, as follows:

$$T_E = T_e + T_w \tag{8}$$

Consequently, we may say that the event E ceases to occur when the wait time $T_w$ is longer than a wait-time threshold $Th_w$; i.e., for $T_w > Th_w$ the extraction procedure 125 is closed.

The wait-time threshold $Th_w$ defines a maximum length of the time of permanence in the standby state SY. This wait-time threshold $Th_w$ may be fixed, or else, for example, dependent upon the memory available in the System-on-Chip 1005 or else upon the available charge of the battery.

The wait time $T_w$ is not a time in which the extraction module 22 is OFF, but rather is in a standby state SY.

Figure 13:
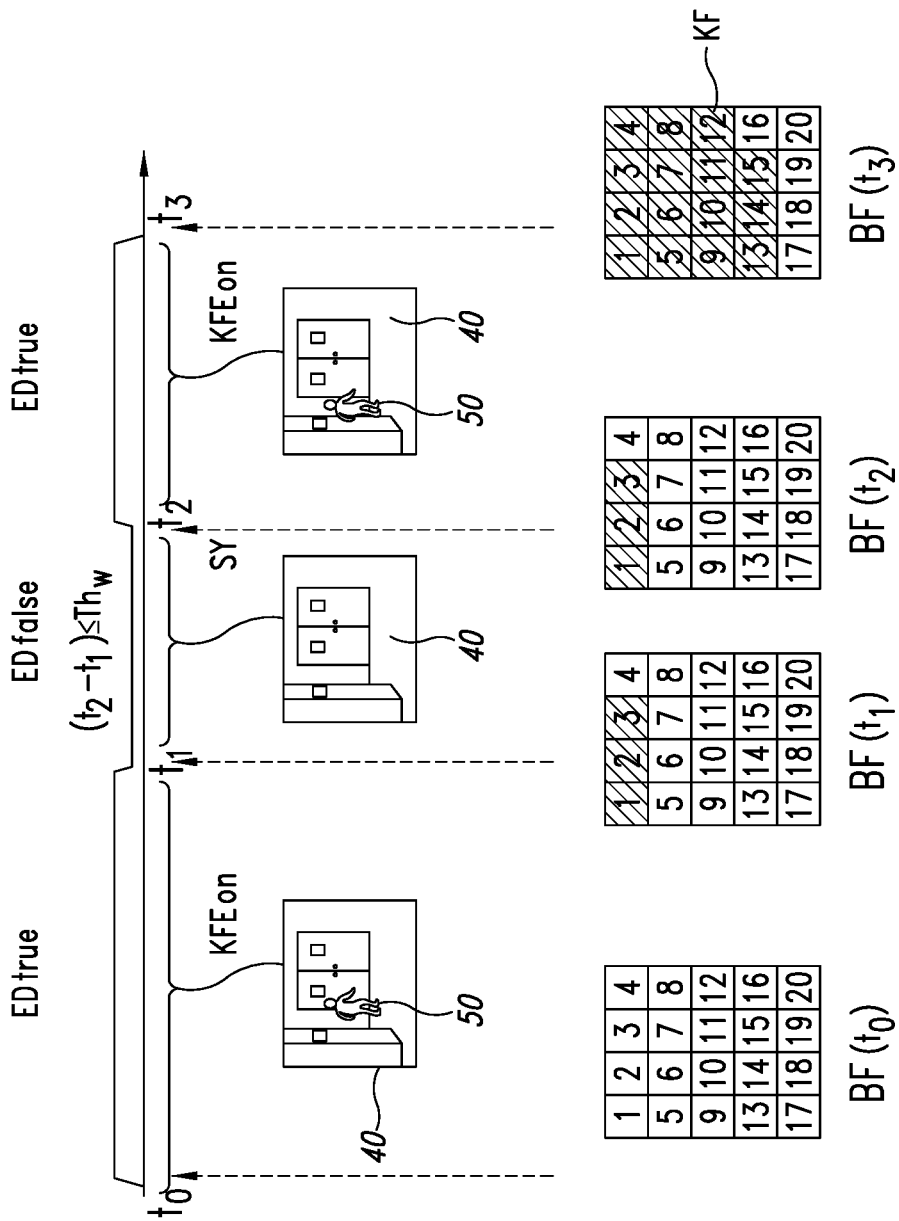

As illustrated more clearly in FIG. 13, in this standby state SY the buffer BF is not emptied and retains its contents.

Figure 9:
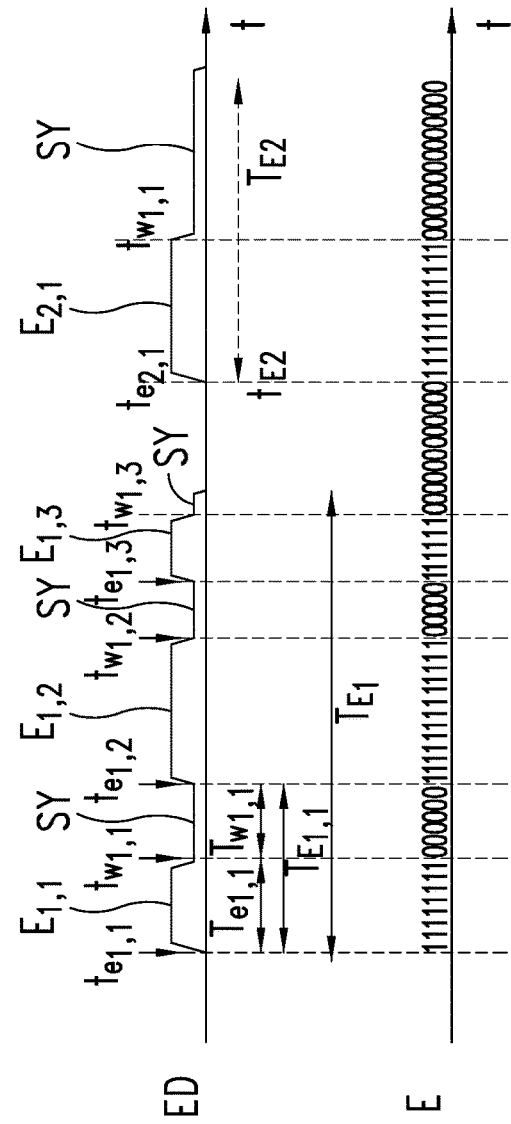

It is possible from this standby state SY for the extraction module 22 to resume operation more than once. In FIG. 9, there two successive events $E_1$, $E_2$ are represented in this regard, with the respective wait times $T_{w1}$, $T_{w2}$ and the respective possible bit strings of the binary signal EB. Of course, the frequency of generation of bits by the event-detection module 15 depends upon its event-detection sampling rate $E_{SR}$.

With reference to FIG. 9, considering first a generic case where an event resumes after a wait time and then possibly resumes again, this event is divided into subevents, for example $E_{1,1}$, $E_{1,2}$, $E_{1,3}$, which refer to one and the same "mother" event, for example $E_1$. When key-frame extraction operation 135 is closed or concluded, by emptying the buffer BF, then a new event opens, for example $E_2$, so that also the times of the subevents are here designated by indices representing both the event and the subevent to which they belong. Consequently, designated by $t_{e1,1}$ is the time of start of the subevent $E_{1,1}$, designated by $t_{e1,2}$ is the time of start of the subevent $E_{1,2}$, and so forth.

A similar approach may be used for the intra-event or subevent wait time $T_w$.

Consequently, designated by $t_{w1,1}$ is the time of start of waiting after the subevent $E_{1,1}$, designated by $t_{w1,2}$ is the time of start of waiting after the subevent $E_{1,2}$, and so forth.

When the key-frame-extraction module 22 is in the standby state SY it means that it is waiting for a new string of '1s' coming from the event-detection module 15.

It is here possible to define a single event $E_i$ as consecutive sequence of subevents $E_{i,j}$ that also includes the corresponding wait times $T_{wi,j}$. In very general terms, the length of an event may be defined theoretically as in the following equation (9), i.e., as a sum of time intervals in which the output of the event-detection module 15 is '1', or EDtrue, i.e., signals the occurrence of the event, and of the corresponding standby times, or wait times $T_{wi,j}$. As before, t (in the lower case) is the instant of start of occurrence of a subevent $E_{i,j}$ or of a standby state SY, whereas T (in the upper case) is the duration of the subevent or a standby state SY.

$$T_{E_i} = \sum_i T_{E_{i,j}} = \sum_j T_{e_{i,j}} + T_{w_{i,j}} \tag{9}$$

Since the system may have limited resources, it may be necessary to set a limit on the subevents that can belong to one and the same event. The total duration of the event $T_E$ may be in any case defined as being between two subevents, designated by the values $J_a$ and $J_b$ of the subevent index j, which belong to one and the same event $E_i$:

$$T_{KFE_i} = \sum_{i=j_a}^{j=j_b} T_{E_{i,j}} \tag{10}$$

There follows a list of the parameters of the model with limited subevents:

$T_{KFC}$, duration of the collection of key frames KF;
$T_{ei}$, complete duration of the i-th event;
$T_{ei,j}$, net duration of the j-th subevent in the i-th event;
$T_{Ei}$ total duration of the event ($T_{ei,j} + T_{wi,j}$);
$T_{KFEi}$, duration of the extraction operation for the i-th event; and
$Th_E$, event-duration threshold.

It may be assumed that the extraction operation always starts with a new event, and the number of subevents and standby times depends upon a number of variables $v_a$, $v_b$, ..., that is potentially even large, representing resources of the system, which mostly express the quality of the platform and the context conditions. Consequently, the values $J_a$ and $J_b$ of the subevent index j may be $$J_b = F(v_a, v_b, v_c \ldots v_x) \tag{11}$$

$$J_a = 0 \tag{12}$$

From the above model and the assumptions in Eqs. (11) and (12) it follows that the duration of the entire operation of extraction of the key frames is equal to the definition of event given by the platform resources and by the specification of the event.

There now follows a description, with reference to FIG. 10, of the decision adopted in the context of the key-frame collection to terminate this operation or resume it.

In the standby state SY, as has been said, it may be necessary to distinguish when an operation of extraction of key frames KF 135 is to be concluded, by emptying the buffer BF and transmitting the key frames KT contained therein, or otherwise resumed for collecting a further set of candidate key frames.

Illustrated in FIG. 10 is a conditional block 145' that represents a simple criterion that may be used for this purpose:

(a) if the duration $T_E$ of the event E or the duration $T_w$ of standby SY are longer than the respective thresholds, $Th_C$ or $Th_W$, a step 150 is carried out, where the event is closed and the key-frame-extraction operation carries out removal of duplicates 353 for refinement of the key frames and then transmission KT to the gateway 19 or to the user;

(b) if the duration $T_E$ of the event E or the duration $T_w$ of standby SY is shorter than the respective thresholds, $Th_C$ or $Th_W$, steps 351 and 353 are executed, where the event is resumed and the extraction operation continues in order to collect new candidate key frames KF.

The conditional block 145' may, for example, be used instead of block 145 of FIG. 14 for evaluating the existence of a standby condition.

Figure 11:
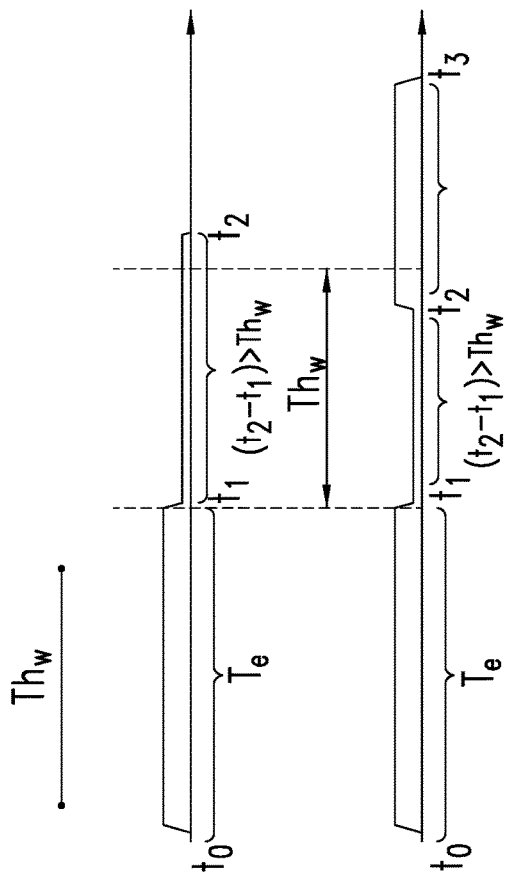

FIG. 11 shows the two different cases: (a) without subevents, (b) where the standby state is entered.

Figure 12:
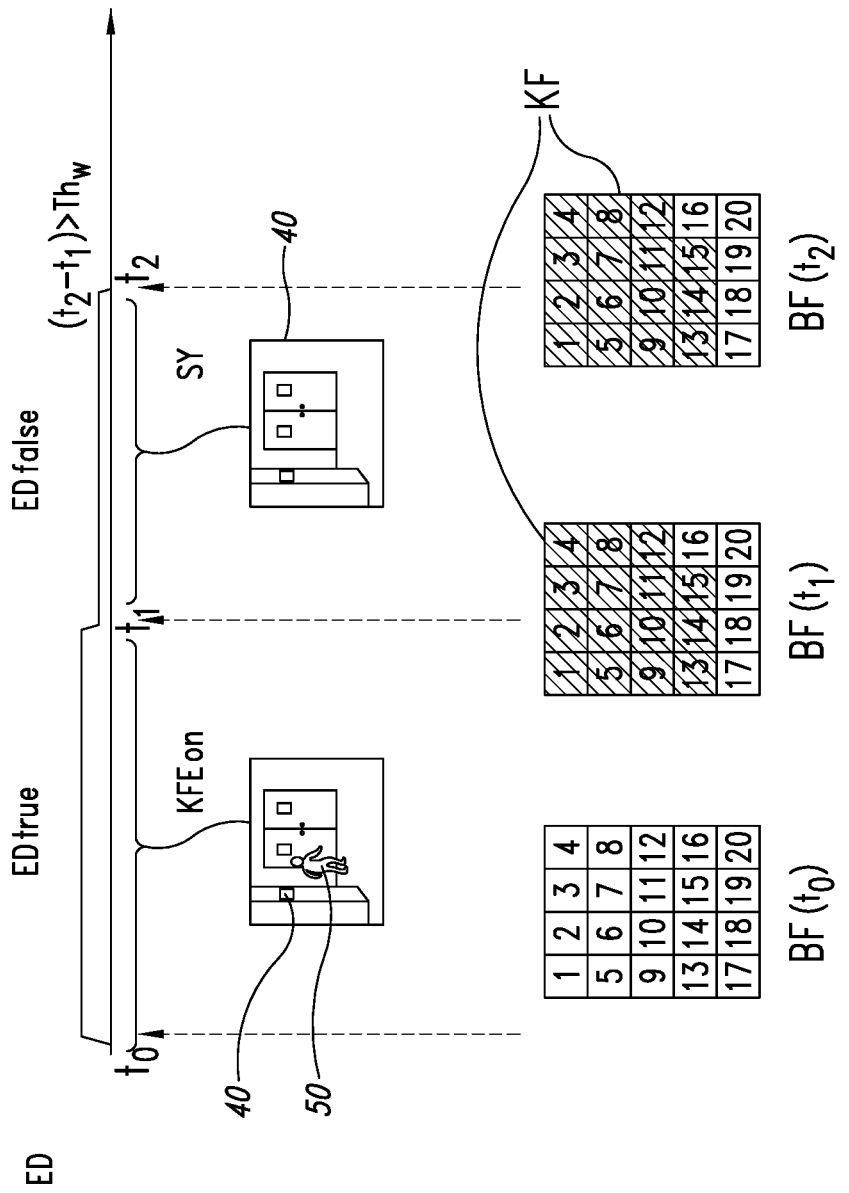
FIGS. 12 and 13 are schematic representations of the states of a buffer in embodiments described in conjunction with FIGS. 5-9 and 11.

The standby state can be described also from the standpoint of the buffer BF in which the storyboard is stored, i.e., the buffer BF of the key-frame-extraction module 22, which stores the key frames, with reference to the simple examples of FIGS. 12 and 13.

Consequently, FIG. 12 illustrates an example of case (a). The event, namely the appearance of a subject 50 on the scene to be surveyed 40, starts at time $t_0$ and terminates at time $t_1$. In the buffer BF there have already been stored fifteen key frames at time $t_1$. The standby state SY starts as hypothesis of the system that waits for a given time, i.e., the wait time $Th_W$, before proceeding to concluding the extraction procedure 125 at time $t_2$. The key frames KF at time $t_2$ in the buffer BF are the same as those at time $t_1$.

Instead, FIG. 13 shows case (b), where, that is, only three key frames are stored in the buffer BF at time $t_1$. The standby state SY starts as hypothesis of the system, but is confirmed, since the event-detection module 15 again detects an event (in particular, the same object determines the event) at time $t_2$, and then the extraction operation 135 is resumed at time $t_2$. The buffer BF stores new key frames in addition to the first three key frames: in the example illustrated, the key frames at the subsequent time $t_3$ have become fifteen.

The parameters, such as event-detection rate $E_{SR}$, event-duration threshold $Th_E$, wait-time threshold $Th_W$, duration of key-frame collection $T_{KFC}$, and total integer number of key frames #KF, may depend upon:

fixed quantities, determined heuristically, or by characteristics of the battery of the System-on-Chip 1005, or by memory space allocated in the System-on-Chip 1005, or by computational constraints, or by high-level or low-level characteristics that can be detected by the System-on-Chip 1005, as well as by a combination of the factors just listed;

functions dependent upon the value assumed by variables at time t of capture of the event E, such as the residual life of the battery, the memory space still available in the storyboard buffer BF, the number of key frames #KF in the buffer BF at time t;

functions dependent upon the value assumed by variables at time t of capture of the subevent, similar to the ones listed in the previous point; and default settings if the System-on-Chip is supplied, or installed in particular scenarios, or is in a combination of these two conditions.

The key-frame-extraction module 22 is fully configurable and scalable; i.e., its parameters can be sized on the basis of the input coming from the event-detection module 15.

The description of the event $\vec{E}$ (descriptive parameters of the event regarding temperature, face, person, conditions of light, etc.) and the state of the video camera $\vec{S}$ (state parameters such as battery level, occupation of memory, etc.) contain information that may form the argument of a generic scalability function $f(\vec{E}, \vec{S})$.

The above generic scalability function $f(\vec{E}, \vec{S})$ enables, for example, configuration of the number of key frames that make up the final storyboard, i.e., the number #KF of key frames extracted depending upon the state of the video camera $\vec{S}$ and upon the information in the description of the event $\vec{E}$. Emphasized in particular is the threshold of similarity between the key frames in the duplicate-removal function 353: the larger this threshold, the shorter the storyboard, i.e., the number of key frames KF transmitted.

The number of key frames KF transmitted may also be reduced by reducing the sampling rate $S_R$, which leads to a slower filling of the buffer BF.

An important aspect regards the cost in terms of memory and the computational cost, aspects that are not so important for smartphones or video cameras coupled to computers, but are instead very important for sensors of the smart type in low-consumption contexts.

The System-on-Chip 1005 described in FIG. 2 enables (or may even require) an ample configuration of the chain of the key-frame-extraction procedure 135, which is possible in so far as the extraction module 22 receives the information coming from the analysis in the event-detection module 15, and the state of the video camera 12 as illustrated in FIG. 14.

The description of the event $\vec{E}$ and the state of the video camera $\vec{S}$ can be used for configuring the extraction operation so as to negotiate between the characteristics (in general, the so-called verbosity) of the visual storyboard SB and the available resources.

Listed below are parameters and thresholds of the key-frame-extraction module 22 that enable configuration or scaling with respect to the availability of resources of the system:

Size $B_S$ of the buffer BF that contains the storyboard SB;
threshold of similarity between key frames $Th_S$;
sampling rate $S_R$;
number $I_K$ of iterations Kmeans in the duplicate-removal operation 353;
size $D_S(i)$ of the description of the representation of the i-th key frame $KF_i$;
ratio of compression $C_S(i)$ of the thumbnail of the i-th key frame $KF_i$; and
number of key frames #KF.

In the above list, it is possible to expand some variables that contribute to selection of the key frames. In particular, this is possible for the duplicate-removal operation 353 where it is possible to control the following parameters to configure or scale with respect to the availability of resources of the system:

threshold of minimum number of key frames $Th_{MIN_{KFs}}$;
threshold of maximum number of key frames $Th_{MAX_{KFs}}$;
threshold of minimum number of scenes segmented $Th_{MAX_{Sc}}$; and
incremental increase $Th_{Inc}$ of the threshold in the case where the number of key frames #KF obtained is smaller than the threshold of minimum number of key frames $Th_{MIN_{KFs}}$.

It is also possible to control the following parameters to configure or scale with respect to the availability of resources or the characteristics of the individual components of the system regarding the representation of the key frames:
width of the rectangular grid of the image Wgrid;
height of the rectangular grid of the image Hgrid;
rectangular region of interest between two points ROI (x1, x2); and
size of the histogram for filtering, analysis Hs.

Provided hereinafter are examples of how the parameters referred to above can be used in connection with the description of the event $\vec{E}$ and the state of the video camera $\vec{S}$.

As regards configuration of the operation of extraction of the key frames with respect to the information deriving from the description of the event $\vec{E}$, in FIG. 5 there is exemplified the possibility of describing the event E through sensor fusion. In such a circumstance, the data coming from certain ones of the sensors $S_0 \ldots S_n$ will be more important than others and it is possible to discern or in any case assign a level of importance to the events, at least in typical cases of use. This is particularly important in scenarios in which there is not envisaged, or certain human intervention to judge, the importance of an event or distinguish whether the event $E_i$ is more important than the event $E_j$, instead of an automatic evaluation.

In fact, for example:
  a marked acceleration, which can be detected via MEMS accelerometers connected to the System-on-Chip in the set of sensors $S_0 \ldots S_n$, for example due to an earthquake, is more important than a cat that passes in front of the video camera without making any noise;
  a loud noise, i.e., peaks of the acoustic level picked up through microphones in the set of sensors $S_0 \ldots S_n$ represents a more alarming event than a man who enters a room, perceived through an accelerated person-detection hardware that operates on the images of the video camera 12 and is available in the System-on-Chip 1005, during a party;
  a face (perceived through an accelerated face-detection hardware that operates on the images of the video camera 12 and is available in the System-on-Chip 1005) is less alarming than a person who falls on the floor.

The verbosity of the visual storyboard presented as collection in storyboard style of thumbnail-format images can be easily set in relation with the characteristics of the event $E_i$. The more important the event, the more information is usually desired regarding that event (or subevent); i.e., it is desirable to have a larger number of key frames in the storyboard SB of this event or else specific key frames of higher quality.

As regards configuration of the key-frame-extraction procedure 125 with respect to the resources available, indicated, for example, by the state of the video camera 12, the resources in terms of memory or computational cost can, for example, be taken into account.

To save memory space it is possible to operate on the number of key frames stored in the buffer BF, but also on the space occupied by their representations or for carrying out analysis and selection of the key frames. In this regard, the key-frame-extraction operation may be in a critical phase when it is resumed from a standby state SY: in this case, there might in fact be just a small portion of memory available for analysis and storage of the key frames.

If the sensor determines a standby state, the buffer BF could be half full. With a numerical example, it could happen that, given 200 KB of memory already occupied while the key-frame-extraction module 22 is waiting, there are approximately 100 KB available for storing other frames, as well as their representation for selecting the candidate key frames for the final storyboard.

When the key-frame-extraction operation is resumed from the standby state it is hence possible, in order to save memory space, to:
  change the type of representation (type of histogram, statistics of the matrix, or a combination thereof);
  define the grid of the image and hence analyze only part of the grid, or else render compact or group together portions of a selection of elements, in particular adjacent squares of the grid, or else render compact or group together portions of a selection of non-adjacent squares of the grid;
  extend or reduce the rectangular ROI (Region of Interest) for global representation of the frames;
  introduce the ROI in the squares selected as above; and
  use a generic algorithm for segmentation of objects instead of the ROI.

As regards the computational cost, the possibilities of achieving savings are more linked to the installation site, at the battery level, and more in general to the state of the camera. It is possible to skip operations that are costly from the computational standpoint, such as analysis of sharpness or other algorithms that are not accelerated via hardware or in any case are too slow for a particular use, installation, or scenario.

In addition, the level of charge of the battery may force or encourage the use of more compact storyboards or limit the use of types of visual analysis that do not exploit hardware accelerations.

Consequently, it is possible to:
  change the type of distance between the frames;
  employ more compact representations as described previously, in particular to define the grid of the image and perform one of the operations of analysis or compacting described above, and extend or reduce the ROI;
  skip algorithms that are costly from a computational point of view, such as analysis of sharpness or other visual analyses; and
  limit the total number of key frames.

The key-frame-extraction module 22 may in any case be configured remotely by a system that connects up to the video camera via the gateway 19 or other network or connection, for example in a context of home automation and of use of domotic networks.

The parameters and thresholds of the key-frame-extraction module 22 previously listed, which enable configuration or scaling with respect to the availability of resources of the system may depend upon:
  fixed quantities, determined:
  heuristically;
  by available resources of the System-on-Chip, as indicated above (computational cost or cost in terms of memory space);
  by high-level or low-level features that can be detected by the System-on-Chip;
  by a combination of the factors just listed above;
  functions dependent upon the value assumed by variables at the time t of capture of the event:
  variables regarding available resources of the System-on-Chip, as indicated above (computational cost or cost in terms of memory space);
  the number of key frames already in the buffer at time t;
  functions dependent upon the value assumed by variables at time t of capture of the subevent:
  similar to the ones listed in the previous point;
  dependent upon objects/characteristics that identify the importance of each subevent with respect to the adjacent subevents; for instance, it is possible to allocate more memory, a higher number of key frames KF, or else raise or relax the thresholds and the parameters for an event that is less important or more important than another one; the importance of each event may be a function of:

the quantities $T_{KFC}$ (duration of the collection of key frames KF), $T_E$ (duration of the event), $T_e$ (net duration of the event), $T_w$ (wait time), $Th_w$ (wait-time threshold), $E_{SR}$ (sampling rate);

the characteristics of the System-on-Chip;

specific scenarios in which the system is installed;

a combination of points i, ii, and iii;

default settings if the System-on-Chip is a. supplied, or b. installed in particular cases of use;

configured through a network connection by:

a. a generic central intelligence (e.g., centralized domotic-control networks of the smart-home type);

b. a connection to other sensors;

c. the network connection may be wired or wireless and may use any protocol, for example of the ones available in NFC or via IP addresses;

any combination of the previous quantities and parameters.

Addition to the states of activation of the "live" process of key-frame extraction of a standby state correlated to the definition of a structure of control events and subevents is of particular importance for obtaining the above reduction in an effective way in a context of video surveillance, in so far as it modifies the modalities of storage, processing, and transmission of the data.

Of course, without prejudice to the principle disclosed herein, the details and embodiments may vary, even appreciably, with respect to what has been described herein purely by way of example, without thereby departing from the spirit and scope of the present disclosure.

An embodiment of a video-surveillance method and system envisage generating and sending a storyboard made up of key frames from the video camera for executing surveillance functions. Of course, in variant versions, there is envisaged storage, for example locally in the video camera, also of the complete sequence acquired corresponding to a given key frame or storyboard, which can be examined, for example by sending it to the gateway, on request.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising:
a device configured to capture a plurality of images;
an event detection circuit configured to detect an event in a trigger region in response to the captured plurality of images, and configured to generate an event signal having a first value in response to a presence of the event, and to generate the event signal having a second value in response to an absence of the event, the detection circuit positioned proximate the trigger region; and
an extraction circuit including a buffer, the extraction circuit configured to operate in an activation state, a standby state, and a deactivation state, the extraction circuit configured to operate in the activation state to extract from the captured plurality of images of a scene key frames indicative of the event in response to the event signal having the first value to generate a storyboard of the event and configured to store the extracted key frames forming the storyboard in the buffer, the extraction circuit being positioned proximate the scene and the scene being proximate the trigger region, and the extraction circuit being further configured to operate in the standby state to suspend for a wait time the extraction in response to the event signal having the second value, and configured to resume the extraction and storage in the buffer in response to the event signal again having the first value during the wait time and, upon the wait time reaching a wait time threshold without the event signal again having the first value, the extraction circuit further configured to operate in the deactivation state to send the storyboard over a network to a remote system configured to provide access to the storyboard to a plurality of systems coupled to the network and to operate in the deactivation state to empty the contents of the buffer after the storyboard has been sent over the network.

2. The apparatus of claim 1 wherein the extraction circuit is further configured to operate in the deactivation state to send the storyboard over the network in response to the event signal having the first value and the second value for an event time that exceeds an event time threshold.

3. The apparatus of claim 1 wherein the event detection circuit is configured to indicate an end of the event in response to generating the event signal having the second value for a period of time that exceeds a threshold.

4. The apparatus of claim 1 wherein the event detection circuit is configured to indicate an end of the event in response to generating the event signal having the first value and the second value for a period of time that exceeds a threshold.

5. The apparatus of claim 1 wherein the event detection circuit is configured to detect the event in response to a sensor signal.

6. The apparatus of claim 1, further comprising a device configured to capture the images in response to the event signal having the first value, to suspend the capturing in response to the event signal having the second value, and to resume the capturing in response to the event signal having the first value.

7. A method, comprising:
capturing a plurality of images of a scene with a video surveillance system positioned proximate the scene;
in the video surveillance system,
detecting an occurrence of an event in a trigger region that is proximate the scene based on at least one of the captured plurality of images;
extracting key frames from the plurality of captured images in response to detecting the occurrence of the event;
storing the extracted key frames to form a visual storyboard of the detected event;
suspending the extracting in response to a first absence of the event;
continuing the extracting in response to a first recurrence of the event within a wait time threshold; and
transmitting the visual storyboard from the video surveillance system over a network to a remote system if there is no first recurrence of the event within the wait time threshold; and
deleting the stored visual storyboard after the storyboard has been transmitted over the network.

8. The method of claim 7, further comprising ceasing the extracting for the event in response to the absence of the event for a time that exceeds a threshold.

9. The method of claim 7, further comprising ceasing the extracting for the event in response to the occurrence of the event and the absence of the event for a period of time that exceeds a threshold.

10. The method of claim 7, further comprising ceasing the extracting for the event in response to the occurrence of the event for a period of time that exceeds a threshold.

11. The method of claim 10, further comprising sending the at least one image to the remote system after ceasing the extracting.

12. The method of claim 7, further comprising:
generating a trigger signal in response to the occurrence of the event; and
extracting the at least one image in response to the trigger signal.

13. The method of claim 7, wherein the remote system is not proximate the video surveillance system and the scene.

14. The method of claim 7, further comprising
capturing the plurality of images in response to the occurrence of the event;
suspending the capturing of the plurality of images in response to the absence of the event; and
continuing the capturing in response to the first reoccurrence of the event.

15. The method of claim 7, further comprising:
suspending the continuing of the extracting in response to a second absence of the event; and
recontinuing the extracting in response to a second recurrence of the event.

16. A non-transitory computer readable medium storing instructions that, when executed by a computing machine, cause the computing machine or an apparatus responsive to the computing machine:
to sense the occurrence of an event in a trigger region based on at least one of a plurality of images captured by an image capture device;
to extract from the plurality of captured images of a scene key frames indicative of the event in response to sensing the occurrence of the event, the trigger region being proximate the scene;
to store the key frames that collectively form a storyboard of the event;
to suspend the extracting of the key frames in response to a first absence of the event;
to continue to extract key frames and store the key frames in response to a first recurrence of the event within a wait time threshold;
to transmit over a network to a remote system the stored key frames forming the storyboard if there is no first recurrence of the event within the wait time threshold; and
to erase the stored key frames after the storyboard has been sent over the network.

17. The non-transitory computer readable medium of claim 16, wherein the trigger region is part of the scene.

* * * * *